United States Patent
Butera et al.

(10) Patent No.: US 7,523,585 B2
(45) Date of Patent: Apr. 28, 2009

(54) MOTOR-VEHICLE DOOR PROVIDED WITH A DEVICE FOR MOVING THE WINDOW PANE WHEN THE DOOR IS OPENED AND CLOSED

(75) Inventors: Francesco Butera, Turin (IT); Stefano Alacqua, Cascine Vica (IT); Alessandro Zanella, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 437 days.

(21) Appl. No.: 11/300,397

(22) Filed: Dec. 15, 2005

(65) Prior Publication Data

US 2006/0265965 A1    Nov. 30, 2006

(30) Foreign Application Priority Data

May 27, 2005    (EP)    ................... 05425381

(51) Int. Cl.
*E05F 11/38*    (2006.01)

(52) U.S. Cl. ............. 49/72; 49/280; 49/348; 49/375

(58) Field of Classification Search ............. 49/72, 49/276, 280, 348, 349, 375, 502, 374, 350, 49/351; 318/264–267, 280, 286, 466–469, 318/626; 296/146.2, 146.9, 146.14
See application file for complete search history.

(56) References Cited

U.S. PATENT DOCUMENTS

| 4,571,884 | A | | 2/1986 | Hetmann et al. |
| 4,785,582 | A | * | 11/1988 | Tokue et al. .................. 49/211 |
| 5,810,423 | A | * | 9/1998 | Brackmann et al. ...... 296/146.2 |
| 6,166,508 | A | * | 12/2000 | Kalb .......................... 318/632 |
| 6,502,352 | B1 | * | 1/2003 | Bonduel ....................... 49/26 |

FOREIGN PATENT DOCUMENTS

FR    2 666 111    2/1992

* cited by examiner

*Primary Examiner*—Gregory J. Strimbu
*Assistant Examiner*—Michael J Keller
(74) *Attorney, Agent, or Firm*—Nixon & Vanderhye P.C.

(57) ABSTRACT

A door for a motor vehicle of the type without frame for the side window is provided with a device for controlling a slight movement of the window from and into its completely raised position upon opening and closing of the door. Said device comprises shape-memory actuating means.

6 Claims, 3 Drawing Sheets

MOTOR-VEHICLE DOOR PROVIDED WITH A DEVICE FOR MOVING THE WINDOW PANE WHEN THE DOOR IS OPENED AND CLOSED

BACKGROUND OF THE INVENTION

The present invention relates to doors of motor vehicles, of the type comprising a supporting structure, a window that can be moved vertically with respect to the supporting structure, an electric-actuation transmission for controlling movement of the window, and means for causing a displacement of the window from and into its completely raised position when the door is opened or closed, respectively.

The need for providing the aforesaid means for automatic actuation of the window arises specifically in motor vehicles of the type in which the side doors are without a frame for the side window and in which, when the door is closed and the window is completely raised, the latter engages a groove made in a weather strip carried by the body of the motor vehicle so that opening of the door would be prevented. For this purpose, already known to the art is provision of a system of automatic electrical actuation controlled by an electronic control unit, which is capable of detecting a manoeuvre of opening or closing of the door and which consequently causes a slight movement of opening of the window upon opening of the door should the window be initially in the completely raised position. Likewise, when the door is closed again, the same automatic-actuation system brings the window back into its completely raised position.

SUMMARY OF THE INVENTION

The purpose of the present invention is to provide a door of the type indicated above, in which the system for automatic actuation of the window upon opening and closing of the door will be particularly simple, will be of small overall dimensions, inexpensive, easy to install, and efficient and reliable in operation.

With a view to achieving the above purpose, the subject of the invention is a door for a motor vehicle having all the characteristics indicated at the beginning of the present invention and further characterized in that the aforesaid means for bringing about displacement of the window comprise a coupling between the window and a driven member controlled by said transmission designed to enable a movement of the window with respect to the driven member, shape-memory actuating means for controlling movement of the window with respect to the driven member, and an electronic control unit designed to detect the open condition and closed condition of the door and the position of the window, and further designed to actuate said actuating means to bring about displacement of the window from and into its completely raised position when the door is opened or closed, respectively.

BRIEF DESCRIPTION OF THE DRAWINGS

The invention will now be described with reference to the annexed plate of drawings, which are provided purely by way of non-limiting example, and in which.

DETAILED DESCRIPTION OF THE INVENTION

Figure 1:
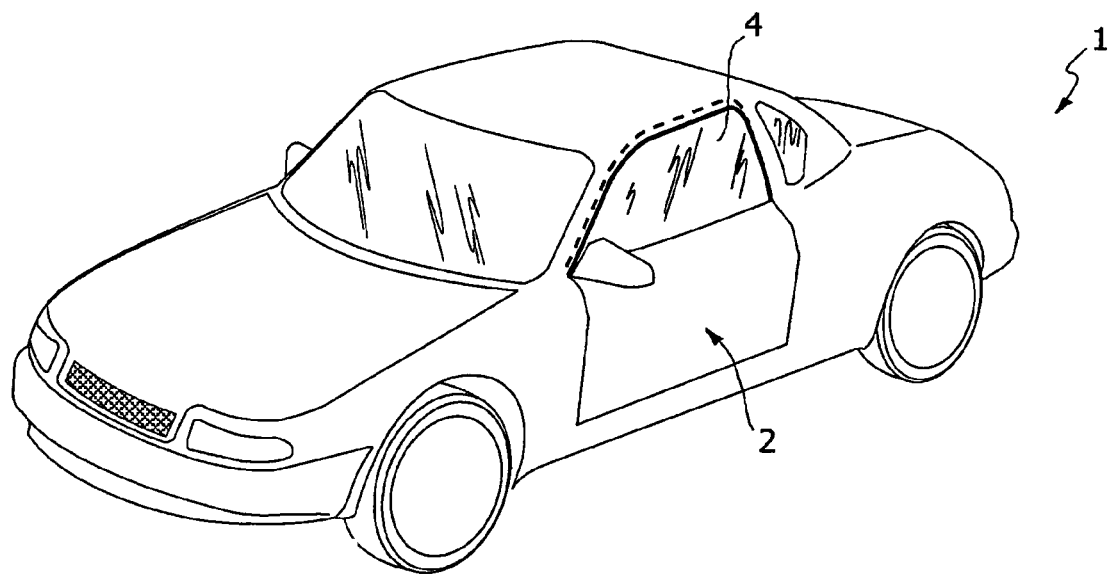
FIG. 1 is a perspective view of a motor vehicle provided with doors made according to the present invention.
Figure 2:
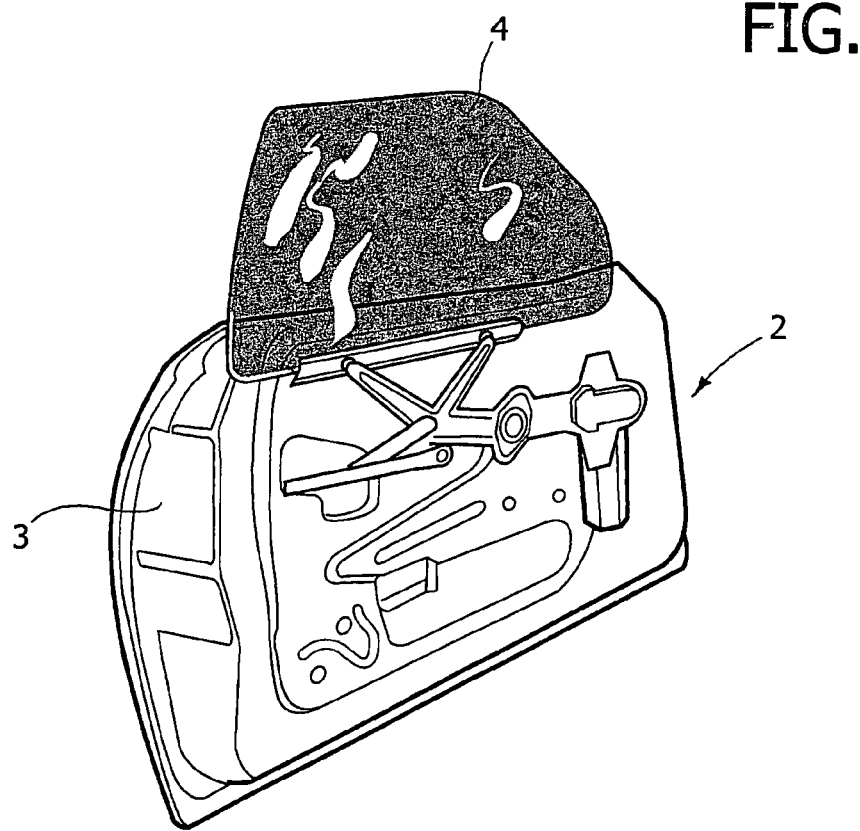
FIG. 2 is a schematic perspective view of the door of the motor vehicle of FIG. 1, viewed from the inside, with the coating panel removed in order to show the members housed inside the door.

In FIG. 1, the reference number 1 designates a motor vehicle provided with two side doors 2, each of which has a structure without frame for the side window. Each door 2 has a supporting structure 3 (FIG. 2), and a window 4 vertically mobile between guides 5 (see FIG. 3) mounted in the structure of the door. In the closed condition of the door with the window 4 in its completely raised position, the window engages the groove of a weather strip (not visible in the drawings) carried by the body of the motor vehicle, and precisely made partly in the respective upright of the windscreen, partly in the side edge of the roof, and partly in the upright of the body behind the opening provided for the door.

Figure 3:
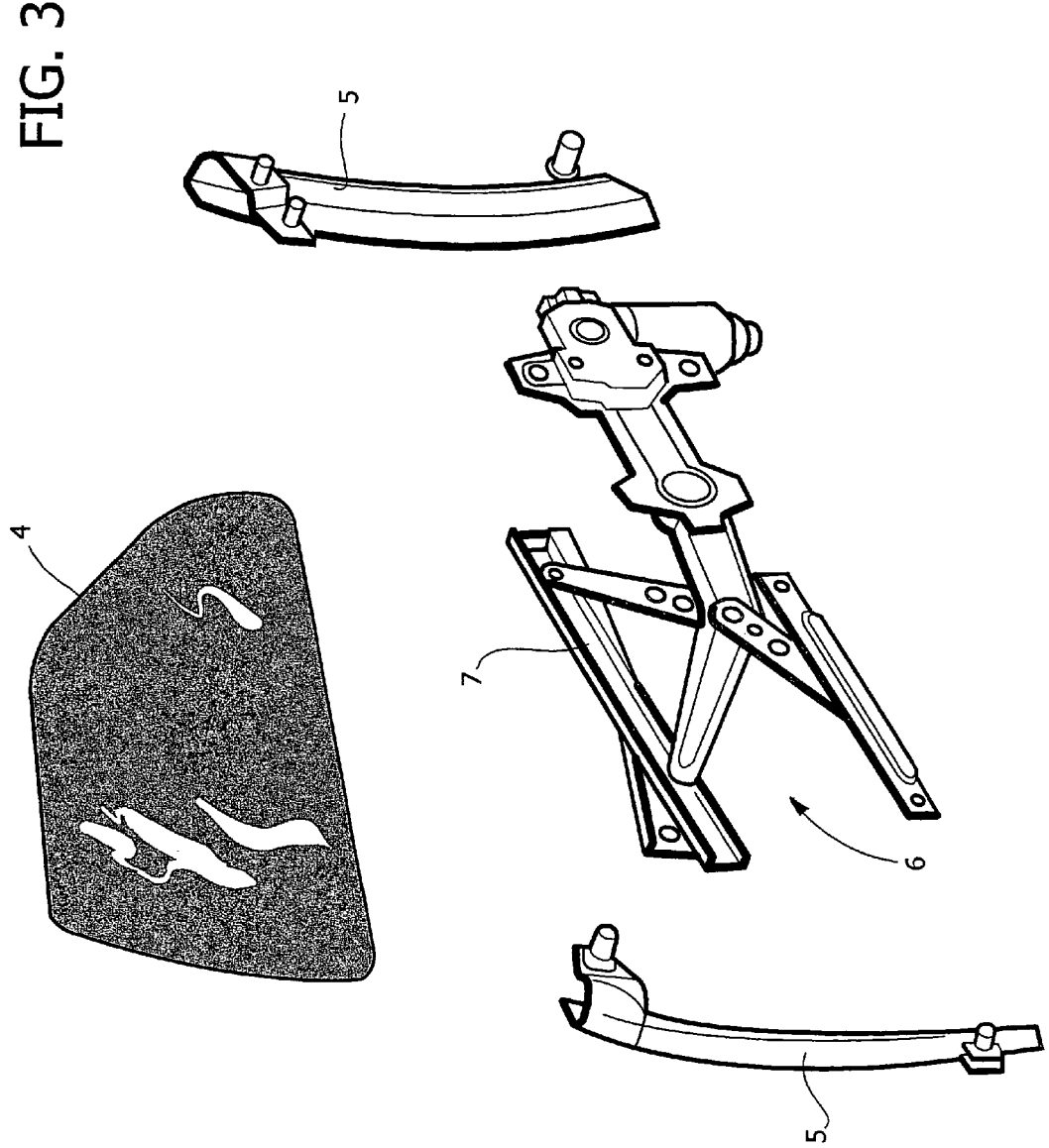
FIG. 3 is an exploded perspective view of some components of the door.

With reference to FIG. 3, number 6 designates as a whole a transmission for controlling vertical movement of the window 4 with respect to the guides 5. The transmission 6 can be of any known type and is consequently not described in detail herein. It is actuated by an electric motor controlled by an electronic control unit, which controls the movement of opening and closing of the window following upon intervention on a control pushbutton provided on the motor vehicle.

Figure 4:
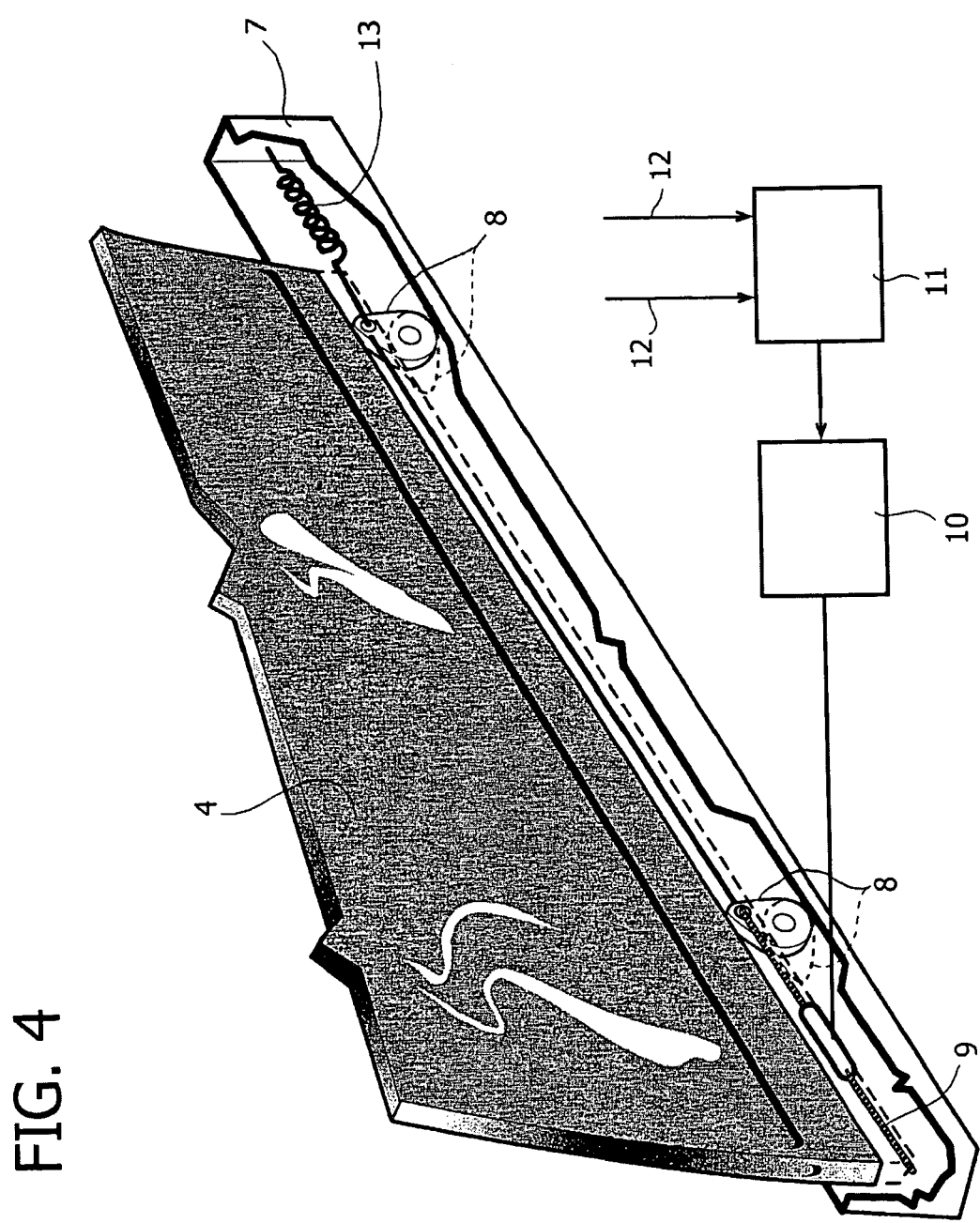
FIG. 4 is a partial schematic view that shows the device for controlling the slight displacement for opening and closing of the window that is controlled automatically upon closing and opening of the door.

According to the invention, the window 4 has its bottom edge coupled to a driven member 7, in the form of a horizontal bar, which is controlled by the transmission 6. The bar 7 is provided with a seat in which the window 4 is slidably mounted so as to be able to perform a slight vertical movement with respect to the bar 7. The bar 7 carries a pair of cams 8, which are mounted articulated on the bar 7 and which can be brought from a horizontal, inoperative, position to a vertical, operative, position (in which they raise the window 4 by a small amount) by means of a shape-memory wire 9. Shape-memory alloys are known and have been used for some time. They are characterized by the property of changing state when a threshold temperature is exceeded. In the specific case of a shape-memory wire, the latter can be prearranged for reducing in length when its temperature of transition is exceeded. In the case in point, heating of the shape-memory wire 9 is obtained by causing it to be traversed by electrical current via electrical-supply means 10, schematically illustrated in FIG. 4, controlled by an electronic control unit 11, which receives signals 12 indicating the condition of the door (open or closed) and the possible positioning of the window 4 in its completely raised condition.

When the door is closed and the window 4 is completely raised, a possible manoeuvre of opening of the door is detected by the electronic control unit 11, which causes actuation of the shape-memory wire 9 and consequent lowering of the window 4 by a small amount, sufficient to enable disengagement of the window from the corresponding weather strip and correct manoeuvre of opening of the door. Lowering of the window is obtained in so far as the shape-memory wire 9 displaces the cams 8 from the position corresponding to the most raised position of the window to a rotated position, in which the window can drop by gravity within its seat provided in the bar 7. Upon reclosing of the door, the shape-memory wire is de-activated, and a return spring 13 brings the cams 8 back again into their position of complete raising of the window 4.

Of course, instead of the cam device described above it is possible to envisage any different mechanical transmission, for example, one using a lever mechanism or a wedge system.

The advantage of the invention lies in the fact that the control device for controlling slight displacements of the window is extremely simple, of small overall dimensions, and easy to install.

It is likewise possible to envisage first and second shape-memory actuating means for controlling, respectively, slight lowering and slight raising of the window, as well as engagement means for maintaining the window in the position reached, after de-activation of the shape-memory means. It is likewise possible to use shape-memory actuating means of a bistable type for controlling lowering or raising of the window at each successive activation.

Of course, without prejudice to the principle of the invention, the details of construction and the embodiments may vary widely with respect to what is described and illustrated herein purely by way of example, without thereby departing from the scope of the present invention.

What is claimed is:

1. A door of a motor vehicle, comprising:
   a supporting structure, a window vertically mobile with respect to the supporting structure;
   an electric-actuation transmission for controlling movement of the window; and
   means for causing a displacement of the window between a completely raised position and a partially lowered position when the door is opened or closed respectively,
   wherein said means for causing displacement of the window comprise:
   a coupling between the window and a driven member controlled by said transmission, which enables a movement of the window with respect to said driven member;
   shape-memory actuating means for controlling the movement of the window with respect to said driven member said shape-memory actuating means being activated by an electrical current passing therethrough; and
   an electronic control unit which detects the open or closed state of the door and the position of the window and actuates actuate said shape-memory actuating means to bring about displacement of the window between the window's completely raised position and partially lowered position when the door is opened or closed, respectively.

2. The door according to claim 1, wherein said shape-memory actuating means comprise a shape-memory wire and means for causing the shape-memory wire to be traversed by said electrical current.

3. The door according to claim 2, wherein said shape-memory means further comprise a return spring for recalling the shape-memory wire towards its inoperative position.

4. The door according to claim 2, wherein said shape-memory actuating means comprise at least one actuation member displaceable between a first operative position corresponding to the completely raised position of the window and a second operative position corresponding to said partially lowered position of the window.

5. The door according to claim 4, wherein activation of the shape-memory actuating means causes lowering of the window, the movement of raising the window being controlled by elastic return means when the shape-memory actuating means are de-activated.

6. The door according to claim 4, wherein the shape-memory actuating means comprise a bistable actuating means.

* * * * *